May 29, 1962
L. LE FLEM ET AL
3,036,966
MANIPULATING APPARATUS
Filed Aug. 17, 1959
2 Sheets-Sheet 1
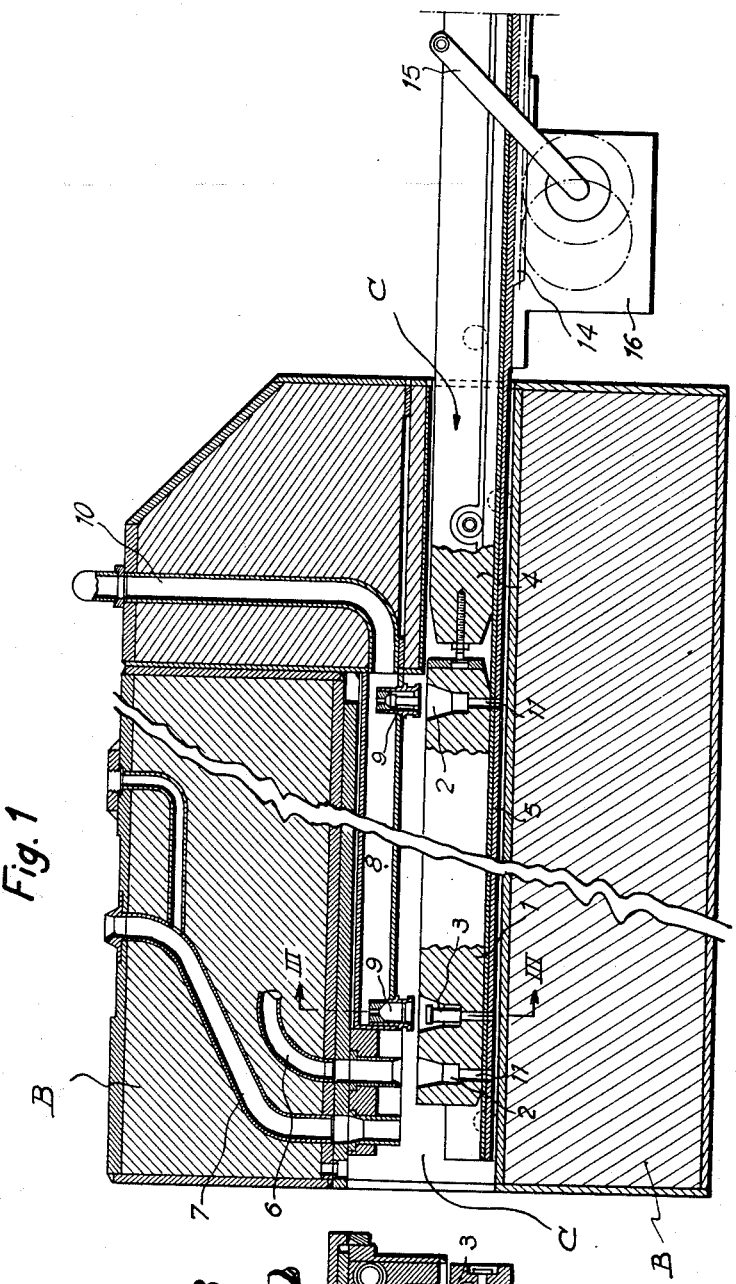
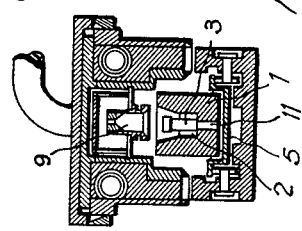
INVENTORS
LEON LE FLEM
JACQUES JOUIN
BY Bacon & Thomas
ATTORNEYS

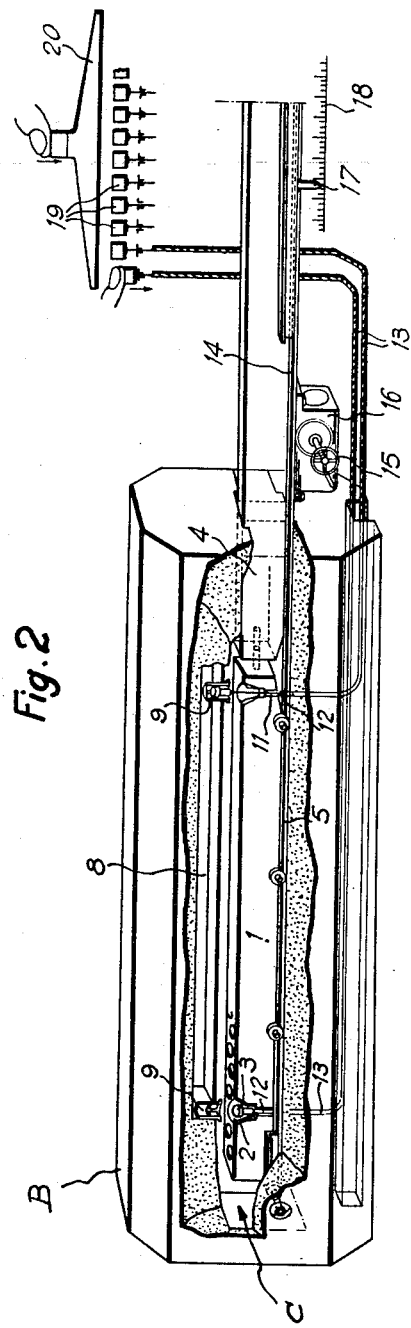

United States Patent Office 3,036,966
Patented May 29, 1962

3,036,966
MANIPULATING APPARATUS
Léon Le Flem, Enghien les Bains, and Jacques Jouin, Chaville, France, assignors to Commissariat a l'Energie Atomique, Paris, France
Filed Aug. 17, 1959, Ser. No. 834,010
Claims priority, application France Aug. 30, 1958
13 Claims. (Cl. 204—193.2)

In certain types of nuclear reactor, samples to be irradiated are placed inside capsules and each capsule is placed in one of the cavities provided in a brick of graphite, or other material having similar nuclear moderating qualities, on one or several longitudinal lines of this brick. The graphite brick is itself introduced into a channel of the reactor.

Periodically, the capsules which are positioned nearest to the core of the reactor and which receive the most irradiation are unloaded and the others are shifted within the brick towards the core on the same line in order that all the capsules will be subjected to a satisfactory irradiation. The cavities in the brick which has been vacated are then loaded with new capsules.

The present invention has for its object to provide manipulating apparatus which is intended to be placed opposite an irradiation channel in a nuclear reactor in order to carry out the operations of loading, unloading and transferring the capsules, it being necessary to effect these operations by remote control.

Such an apparatus is characterized by the fact that it comprises essentially: a protection block having a longitudinal channel provided with a slider, means for securing the brick of graphite or similar material on this slider at a predetermined position, an unloading pipe connected to a channel subjected to a reduced pressure, a loading pipe and a transfer box having cavities aligned in a manner corresponding to those of the graphite brick and connected to a channel subjected to a reduced pressure, and means for displacing said slider along the longitudinal channel of the protection block in order that the cavities of the brick carried by the slider and the loading and unloading pipes and the cavities of the transfer box may be positioned facing one another in chosen relative adjustable positions, and remote control means provided in order selectively to extract the capsules located in the cavities of the brick.

In order that the invention may be more fully understood an embodiment thereof will now be described with reference to the accompanying drawings, in which:

FIGURE 1 is a schematic sectional view of an apparatus according to the invention for manipulating capsules in relation to horizontal irradiation channels of a reactor, FIGURE 2 is a perspective view of this apparatus having parts broken way, and FIGURE 3 is a partial sectional view on the line III—III of FIGURE 1.

Referring to the drawings, a graphite brick 1 is provided with aligned cavities 2 in which are placed capsules 3 containing the samples to be irradiated. This is placed, in the course of the irradiation, in the bottom of a horizontal irradiation channel of a reactor. A protection plug 4, made of steel, is adjustably connected with the brick 1 (FIG. 1). An external plug of concrete, not shown, fitting within the channel in the nuclear reactor, provides further protection against radiation.

The apparatus for manipulating the capsules 3, which, when in use, is brought by means of a carriage (not shown) against the face of the reactor which is opposite the irradiation channel, comprises a protection block B having a central longitudinal channel C equipped with a movable slider 5, riding on rollers supported by the side walls of the channel C, which slider is adapted to be introduced into the channel of the reactor in order to extract from it the protection plug 4 to which the graphite brick 1 is fastened. The block B moreover includes an unloading pipe 6, which may be connected by means of a channel maintained under a reduced pressure to a handling chamber (not shown), a loading pipe 7, and a transfer box 8.

The transfer box 8 has aligned cavities 9, longitudinally disposed in the same manner as those of the graphite brick 1. They are placed under a controlled reduced pressure by means of a channel 10 in order to retain the capsules 3 which are introduced thereinto as will be explained hereunder.

As may be seen from FIGURE 2, the bottom of each cavity 2 of the graphite brick 1 is provided with a hole 11 through which may penetrate a vertically slidable rod 12 which is, for example, actuated by a remote controlled flexible cable 13, the rod 12 being capable of slightly lifting the capsule 3. The cables 13 are individually controlled by buttons 19, or simultaneously by a plate 20.

The slider 5 is moved in the channel C by means of a rack 14 on the bottom of the slider, and a pinion actuated by a handle 15 extending from a gearbox 16 fixed on the manipulation apparatus.

The operation of the apparatus described above is as follows:

The concrete plug, which is not shown in the drawings and which constitutes the external protection of the channel in the nuclear reactor, is first withdrawn and the apparatus is placed in position so that the channel C and the slider 5 are situated in line as an extension of the irradiation channel of the reactor.

The slider 5 is then introduced into the irradiation channel until it comes into contact with a stop (not shown). The steel plug 4 and the graphite brick 1 are placed on the slider by means of a bar and are automatically locked on the slider in front of a fixed mark. The assembly comprising the slider 5 and brick 1 is then withdrawn into the apparatus and its position is marked by an index 17 which moves in front of a graduated scale 18 (FIGURE 2).

When it is desired to unload a capsule, the latter is brought in front of the unloading pipe 6 by displacing the slider 5. The capsule is raised by operation of the corresponding rod 12, the capsule being drawn up through the pipe 6 which is maintained under a reduced pressure, and unloaded through a channel connected to this pipe.

When it is wished to load a capsule, the cavity 2 of the brick 1 which is available is brought in front of the loading pipe 7. The capsule is introduced in the pipe 7 and then pneumatically projected into the cavity.

When it is intended to transfer a capsule from one cavity to another cavity, the capsule to be transferred is positioned below a cavity 9. The capsule is then raised by operating the corresponding rod 12 and since a reduced pressure is maintained in the transfer box 8, the raised capsule is held in the cavity 9 of the transfer box 8. After the brick 1 and the slider 5 with which it is integral have been displaced to a position in which the cavity 2 to which the capsule is to be transferred is below the cavity 9 in which the capsule is supported, the pressure in the transfer box 8 is raised to release the capsule, and the capsule 3 is allowed to drop in the new cavity 2. The gearing is designed so that one turn of the handle 15 is sufficient to displace the slider 5 by an amount corresponding to the distance which separates two cavities, for example. The plate 20, placed above the individual buttons 19 of the flexible cables 13, also enables all the capsules to be simultaneously raised if so desired. It is thus possible to transfer simultaneously, with a staggering of one or several cavities, all the capsules 3 which have remained in the graphite brick 1.

While a particular embodiment has been described it will be understood that various modifications may be made without departing from the scope of this invention.

We claim:

1. Apparatus for manipulating capsules housed in aligned cavities in a block of moderating material which is to be introduced into an irradiation channel of a nuclear reactor, comprising a member of protecting material provided with a channel, a slider in said latter channel, means securing the block of moderating material on this slider at a predetermined position, an unloading pipe communicating with said channel in said member, a loading pipe communicating with said channel in said member and a transfer compartment having cavities communicating with said channel in said member and aligned in a manner corresponding to those in the block of moderating material, means displacing the slider along the channel in said member in order to alter the position of the cavities in the block relative to the loading and unloading pipes and the cavities in the transfer compartment so as to selectively bring at least one of the cavities into a chosen position opposite at least one of the loading pipe, the unloading pipe and the cavities in the transfer compartment, and means selectively extracting capsules located in the cavities of the block.

2. Apparatus as claimed in claim 1, comprising means subjecting the unloading pipe and the transfer compartment to a reduced pressure to facilitate the withdrawal of capsules from cavities in the block.

3. Apparatus as claimed in claim 1, comprising a rack and pinion mechanism moving the slider in the channel in said member and in the channel in said reactor.

4. Apparatus as claimed in claim 1, including remote control means selectively extracting the capsules housed in the cavities of the block, consisting of an ejector rod slidingly mounted in the bottom of each cavity in the block, and a separate externally actuatable flexible cable connected with each ejector rod.

5. Apparatus as claimed in claim 1, including means indicating the position of the slider and the block in the channel in said member.

6. Apparatus as claimed in claim 1, including a driving mechanism connected with the slider, said driving mechanism including a handle, one rotation of the handle displacing the block carried by the slider by a distance corresponding to the distance between two cavities in the block.

7. Apparatus as claimed in claim 4, including means operating a plurality of the rods simultaneously to eject capsules from the cavities in the block.

8. Apparatus for manipulating capsules housed in aligned cavities in a block of moderating material which is to be introduced into an irradiation channel of a nuclear reactor, comprising a member of protecting material provided with a channel, a slider in said latter channel, means securing the block of moderating material on this slider at a predetermined position, an unloading pipe communicating with said channel in said member, means subjecting the unloading pipe to a reduced pressure, a loading pipe communicating with said channel in said member, and a transfer compartment having cavities communicating with said channel in said member and aligned in a manner corresponding to those in the block of moderating material, means subjecting the cavities in said transfer compartment to a reduced pressure, means displacing the slider along the channel in said member in order to alter the position of the cavities in the block relative to the loading and unloading pipes and the cavities in the transfer compartment so as to selectively bring at least one of the cavities into a chosen position opposite at least one of the loading pipe, unloading pipe, and the cavities in the transfer compartment, and remote control means selectively extracting capsules located in the cavities of the block.

9. Apparatus as claimed in claim 8, in which the remote control means selectively extracting the capsules housed in the cavities of the block consists of an ejector rod slidingly mounted in the bottom of each cavity in the block, and a separate externally actuatable flexible cable connected with each ejector rod.

10. Apparatus as claimed in claim 9, including means operating a plurality of the rods simultaneously to eject capsules from the cavities in the block.

11. Apparatus as claimed in claim 10, including a rack and pinion mechanism moving the slider in the channel in said member and the channel in said reactor.

12. Apparatus as claimed in claim 11, including a driving mechanism connected with the slider including a handle, one rotation of the handle displacing the block carried by the slider by a distance corresponding to the distance between two cavities in the block.

13. Apparatus for manipulating capsules housed in aligned cavities in a block of moderating material which is to be introduced into an irradiation channel of a nuclear reactor, comprising a member of protecting material provided with a longitudinal channel, a slider in said latter channel, means securing the block of moderating material on this slider at a predetermined position, an unloading pipe extending through said member of protecting material to said channel in said member, means subjecting said unloading pipe to a reduced pressure, a loading pipe extending through said member of protecting material to said channel in said member, and a transfer compartment having cavities communicating with said channel in said member and aligned in a manner corresponding to those in the block of moderating material, means subjecting the cavities in said transfer compartment to a reduced pressure, means displacing the slider along the channel in said member in order to alter the position of the cavities in the block relative to the loading and unloading pipes and the cavities in the transfer compartment so as to selectively bring at least one of the cavities into a chosen position opposite at least one of the loading pipe, unloading pipe, and the cavities in the transfer compartment, remote control means selectively extracting capsules located in the cavities of the block, and means indicating the position of the slider and the block in the channel in said member.

References Cited in the file of this patent

UNITED STATES PATENTS

| | | |
|---|---|---|
| 2,781,307 | Wigner | Feb. 12, 1957 |
| 2,853,625 | Ohlinger | Sept. 3, 1958 |
| 2,874,107 | Ohlinger et al. | Feb. 17, 1959 |